US012075784B2

(12) United States Patent
Mickley et al.

(10) Patent No.: US 12,075,784 B2
(45) Date of Patent: Sep. 3, 2024

(54) MIXTURES CONTAINING SECONDARY CALCIUM AND MAGNESIUM PHOSPHONATE AND THEIR USE AS FUNGICIDE OR FERTILIZER

(71) Applicant: PrimingTec UG (haftungsbeschränkt), Bobenheim (DE)

(72) Inventors: Cornelia Mickley, Grünstadt (DE); Harald Köhle, Bobenheim (DE)

(73) Assignee: PRIMINGTEC UG (HAFTUNGSBESCHRÄNKT), Bobenheim (DE)

( * ) Notice: Subject to any disclaimer, the term of this patent is extended or adjusted under 35 U.S.C. 154(b) by 827 days.

(21) Appl. No.: 16/468,621

(22) PCT Filed: Dec. 11, 2017

(86) PCT No.: PCT/EP2017/082245
§ 371 (c)(1),
(2) Date: Jun. 11, 2019

(87) PCT Pub. No.: WO2018/108822
PCT Pub. Date: Jun. 21, 2018

(65) Prior Publication Data
US 2020/0008430 A1 Jan. 9, 2020

(30) Foreign Application Priority Data
Dec. 12, 2016 (EP) .................. 16203561

(51) Int. Cl.
*A01N 59/26* (2006.01)
*C05B 9/00* (2006.01)
*C05B 11/04* (2006.01)
*C05B 17/00* (2006.01)
*C05G 5/23* (2020.01)

(52) U.S. Cl.
CPC .............. *A01N 59/26* (2013.01); *C05B 9/00* (2013.01); *C05B 11/04* (2013.01); *C05B 17/00* (2013.01); *C05G 5/23* (2020.02)

(58) Field of Classification Search
CPC ........... A01N 59/26; C05B 9/00; C05B 11/04; C05B 17/00; C01B 25/163
See application file for complete search history.

(56) References Cited

U.S. PATENT DOCUMENTS

| | | |
|---|---|---|
| 4,075,324 A | 2/1978 | Thizy et al. |
| 4,119,724 A | 10/1978 | Thizy et al. |
| 5,514,200 A | 5/1996 | Lovatt |
| 5,736,164 A | 4/1998 | Taylor |
| 5,800,837 A | 9/1998 | Taylor |
| 5,830,255 A | 11/1998 | Lovatt |
| 5,997,910 A | 12/1999 | Taylor |
| 2011/0105323 A1* | 5/2011 | Schneider .............. A01N 47/24 424/602 |
| 2015/0258519 A1 | 9/2015 | Laurent |

FOREIGN PATENT DOCUMENTS

| | | | |
|---|---|---|---|
| EP | 1655275 A2 | 5/2006 | |
| RU | 019069 | * 12/2013 | |
| RU | 019069 B1 | * 12/2013 | |
| WO | 1998038863 A1 | 9/1998 | |
| WO | 2000046169 A2 | 8/2000 | |
| WO | 2010051157 A1 | 5/2010 | |
| WO | 2013098573 A1 | 7/2013 | |

OTHER PUBLICATIONS

Habash et al (Effect of phosphonate fertilizers on the growth of soil fungi), Journal of Life Sciences 8 (2014) 835-840 (Year: 2014).*
Patent Cooperation Treaty, International Searching Authority, Search Report and Written Opinion for PCT/EP2017/082245, 11 pages, Jan. 26, 2018.

* cited by examiner

*Primary Examiner* — Mina Haghighatian
(74) *Attorney, Agent, or Firm* — Viksnins Harris Padys Malen LLP

(57) ABSTRACT

The present invention relates to the use of mixtures containing secondary calcium and secondary magnesium phosphonate for combatting harmful fungi, to the use thereof as fertilizer or plant nutrient, to a mixture, containing secondary calcium and secondary magnesium phosphonate in a specific molar ratio, characterized in that the solid form of the mixture has a water solubility of at most 5 g/l, and to a method for preparing a mixture containing secondary calcium phosphonate and secondary magnesium phosphonate.

14 Claims, 2 Drawing Sheets

MIXTURES CONTAINING SECONDARY CALCIUM AND MAGNESIUM PHOSPHONATE AND THEIR USE AS FUNGICIDE OR FERTILIZER

CROSS-REFERENCE TO RELATED APPLICATION(S)

This patent application claims the benefit of priority of EP Application No. EP 16203561.2, filed Dec. 12, 2016.

The present invention relates to the use of mixtures containing secondary calcium and secondary magnesium phosphonate for combatting harmful fungi, to the use thereof as fertilizer or plant nutrient, to a mixture containing secondary calcium and secondary magnesium phosphonate in a specific molar ratio, characterized in that the solid form of the mixture has a water solubility of at most 5 g/l, to a method for preparing a mixture containing secondary calcium phosphonate and secondary magnesium phosphonate, and to a mixture obtainable by this method.

Organic and inorganic phosphonates are suitable phosphorus suppliers in agriculture and are thus described as fertilizers. They are moreover described to be useful as fungicides.

U.S. Pat. Nos. 4,075,324 and 4,119,724 relate to a fungicidal composition based on phosphorous acid or its salts. Among others, secondary calcium and magnesium phosphonates are described, however not in combination with each other. Secondary calcium and magnesium phosphonates are said to have a good protective action against *Plasmopara viticola* in vine plants.

U.S. Pat. Nos. 5,736,164 and 5,800,837 describe that phosphonates exacerbate the non-target Ascomycete fungi, producing an eiphytotic outbreak of much greater magnitude than the infection occurring without phosphonate treatment (pathological acerbation). This is shown in the examples, where 100% of the leaves of dogwood plants treated with potassium phosphonate were infected with powdery mildew, while only 30% of the leaves of untreated control plants showed infection. To solve this problem and to be able to control both Phycomycetes and Ascomycetes with the same product, a mixture containing a phosphonate selected from $KH_2PO_3$, $K_2HPO_3$ and $K_3PO_3$ and a phosphate selected from $KH_2PO_4$, $K_2HPO_4$ and $K_3PO_4$ is used. U.S. Pat. No. 5,800,837 moreover describes the use of this mixture for stimulating growth in plants.

Also WO 00/461692 mentions the problem of pathological acerbation of phosphonates when used against ascomycetes and suggests mixtures of phosphonates, preference being given to alkali and ammonium phosphonates, with thiosulfates, salicylic acid or salts thereof and/or thiosulfates.

U.S. Pat. Nos. 5,514,200 and 5,830,255 relate to a buffered fertilizer composition comprising an organic acid or salts thereof and a phosphorus-containing acid, such as phosphoric acid, or salts thereof. Secondary calcium and magnesium phosphonates are not specifically mentioned, and from the fact that the fertilizer composition is preferably clear and devoid of precipitates, it can be understood that only water-soluble phosphonates are envisaged, thus excluding secondary calcium and magnesium phosphonates, which are scarcely water-soluble.

It was the object of the present invention to provide an easily available phosphorus-based agent having a fungicidal effect. The agent should be useful for controlling Ascomycetes without the exacerbative effect described in the prior art, but also without needing the additional ingredients used in the prior art for countervailing this effect. The agent should also be useful for controlling other phytopathogenic fungi, especially also Oomycetes and/or Deuteromycetes and/or Zygomycetes, preferably with the same or even improved efficacy as compared to the commonly used alkali metal phosphonates. The agent should also have a fertilizer effect. Another object was to provide an effective, safe, sustainable and cost-efficient method for producing such an agent.

It was surprisingly found that mixtures of secondary calcium phosphonate and secondary magnesium phosphonate not only do not show any exacerbative effect of infections with Ascomycetes, but are even suitable for controlling Ascomycetes. Moreover, these mixtures are useful for combatting a multitude of phytopathogenic fungi and are a suitable plant nutrient, seeing that both calcium and magnesium are valuable plant nutrients, especially for foliar application.

The present invention thus relates to the use of a phosphonate A or of a mixture of phosphonate A and a phosphonate B, for combatting harmful fungi; where
  phosphonate A is a mixture of secondary calcium phosphonate and secondary magnesium phosphonate, and
  phosphonate B is selected from the group consisting of primary calcium phosphonate, primary magnesium phosphonate, secondary potassium phosphonate, primary potassium phosphonate, primary ammonium phosphonate and mixtures thereof.

The invention further relates to a method for combatting harmful fungi, wherein the fungi, their habitat or the materials or plants to be protected against fungal attack, or soil in which the plants grow or are to grow or plant propagation material are treated with an effective amount of a phosphonate as defined above or below, i.e. with a phosphonate A or of a mixture of phosphonate A and a phosphonate B, where phosphonates A and B are as defined above or below. "Habitat" does not include the human or animal body. Thus, the present method does not include the therapeutical treatment of the human or animal body.

Due to the low toxicity of the mixture for vertebrates, the fungicidal effect of said phosphonate can be used for the purpose of preservation in virtually all areas concerning humans and vertebrate animals. Thus, a further aspect of the present invention relates to the use of said phosphonate (i.e. phosphonate A or of a mixture of phosphonate A and phosphonate B, where phosphonates A and B are as defined above or below) as preservative, especially as food preservative.

Further, the invention relates the use of said phosphonate (i.e. phosphonate A or of a mixture of phosphonate A and phosphonate B, where phosphonates A and B are as defined above or below) as fertilizer or plant nutrient.

Moreover, the invention relates to a mixture containing secondary calcium phosphonate and secondary magnesium phosphonate, where the molar ratio of secondary calcium phosphonate to secondary magnesium phosphonate is of from 1:10 to 10:1, preferably from 5:1 to 1:5, in particular from 2:1 to 1:2, specifically from 1.5:1 to 1:1.5; characterized in that the solid form of the mixture has a water solubility of at most 5 g/l, preferably at most 3 g/l at 20° C.

Further, the invention relates to a method for preparing a mixture containing secondary calcium phosphonate and secondary magnesium phosphonate, comprising reacting dolomite with phosphonic acid or with a primary phosphonate.

Furthermore, the invention relates to a mixture obtainable with said preparation method and to its use for combatting harmful fungi, to a method for combatting harmful fungi using said mixture and to its use as fertilizer or plant nutrient.

The below remarks with respect to the phosphonate (i.e. to phosphonate A and to phosphonate B, if present) apply to both the fungicidal use thereof and to the fungicidal method in which the phosphonate is used as well as to its use as fertilizer. Where applicable, the below remarks also apply to the use/method in which the mixture obtainable with the preparation method of the invention is used; these are especially the remarks relating to the fungi to be controlled and the mode and subject (e.g. plants or materials to be treated) of application.

If a mixture of phosphonate A and phosphonate B is used, the term "mixture" does not necessarily require the phosphonates A and B to be present as a physical mixture when applied, but can constitute any desired combination of the two phosphonates in which they are not necessarily formulated together. The phosphonate A and the phosphonate B can thus also be applied separately. In this case, they have of course to be applied in close correlation in terms of space and time. One example of a composition in which phosphonates A and B are not present as a physical mixture is a two-component kit comprising a first component which comprises the phosphonate A and a second component which comprises phosphonate B.

Preferably, however, the mixture of phosphonate A and phosphonate B is a physical mixture.

In terms of the present invention, phosphorous acid and phosphonic acid are used synonymously and designate $H_3PO_3$ (depicted either as $H-P(=O)(OH)_2$ or as its tautomer $P(OH)_3$). Analogously, the terms phosphite and phosphonate are used synonymously and designate both the salts of phosphonic acid. In primary phosphonates one proton is formally replaced by a cationic equivalent $(M^+(H_2PO_3)^-;$ $M^+$ is a cationic equivalent, such as a metal ("Met") cation equivalent $(Met^{x+})_{1/x}$ or an ammonium cation), and in secondary phosphonates, two protons are replaced by a cationic equivalent $((M^+)_2(HPO_3)^{2-})$. Secondary calcium phosphonate is thus $Ca(HPO_3)$, secondary magnesium phosphonate is $Mg(HPO_3)$ and secondary potassium phosphonate is $K_2(HPO_3)$, while primary calcium phosphonate is $Ca(H_2PO_3)_2$, primary magnesium phosphonate is $Mg(H_2PO_3)_2$ and primary potassium phosphonate is $K(H_2PO_3)$.

If used without the specification whether primary or secondary, the term "phosphonate" encompasses both forms.

In a preferred embodiment, the molar ratio of calcium phosphonate in phosphonate A and in phosphonate B, if present, to magnesium phosphonate in phosphonate A and in phosphonate B, if present, is of from 10:1 to 1:10, more preferably from 5:1 to 1:5, in particular from 2:1 to 1:2, more particularly from 1.5:1 to 1:1.5. Specifically, it is approximately 1:1. "Approximately" in this context includes deviations as they occur from weighing errors and/or from fluctuations in the composition of the salts (e.g. due to their source and natural variance of their origin) used for producing the mixture used according to the invention. Such deviations are generally in the range of at most ±10%, preferably of at most ±5%.

Accordingly, the molar ratio of the overall amount of calcium ions in the phosphonates A and B (if present) to the overall amount of magnesium ions in the phosphonates A and B (if present) is preferably of from 10:1 to 1:10, more preferably from 5:1 to 1:5, in particular from 2:1 to 1:2, more particularly from 1.5:1 to 1:1.5. Specifically, it is approximately 1:1. As already defined above, "approximately" in this context includes deviations as they occur from weighing errors or from fluctuations in the composition of the salts used for producing the mixture.

In a particular embodiment, the phosphonate to be used according to the present invention is a mixture of phosphonate A and phosphonate B, where the weight ratio of the overall amount of phosphonate A to the overall amount of phosphonate B is of from 100:1 to 1:1, preferably from 10:1 to 1.5:1, in particular from 10:1 to 2:1.

Phosphonate B, if present, preferably contains secondary potassium phosphonate and/or primary potassium phosphonate, and optionally also primary calcium phosphonate and/or primary magnesium phosphonate and/or primary ammonium phosphonate.

In an alternatively preferred embodiment, phosphonate B, if present, contains primary calcium phosphonate and/or primary magnesium phosphonate, and optionally also secondary potassium phosphonate and/or primary potassium phosphonate and/or primary ammonium phosphonate.

Preferably, the phosphonate A or the mixture of phosphonates A and B is used in form of an aqueous dispersion.

A dispersion is generally a system in which particles are dispersed in a continuous phase of a different composition (or state).

Due to the low water-solubility of secondary calcium and secondary magnesium phosphonate, the dispersion to be used according to the invention is generally a suspension or a colloid.

A suspension is a heterogeneous mixture containing solid particles in which the solute particles are not dissolved, but suspended throughout the bulk of the medium. Generally, the suspended particles are visible to the naked eye or at least under an optical microscope. Unlike in a colloid, the suspended particles will settle over time if left undisturbed.

A colloid is a mixture in which one substance of microscopically dispersed insoluble particles is suspended throughout another substance. Unlike a solution, whose solute and solvent constitute only one phase, a colloid has a dispersed phase (the suspended particles) and a continuous phase (the medium of suspension). To qualify as a colloid and to distinguish from suspensions, the mixture must be one that does not settle or would take a very long time to settle appreciably.

In particular, the dispersion is an aqueous suspension, i.e. a suspension with water or an aqueous solution as dispersing medium.

"Aqueous solution" includes, apart from pure water as dispersing medium, buffered aqueous solutions and mixtures of water with lower alkanols, such a methanol, ethanol, n-propanol or isopropanol. If a mixture of water and an alkanol is used, the weight ratio of water to alkanol is preferably in the range of from 100:1 to 1:1, more preferably from 50:1 to 2:1 and in particular from 20:1 to 10:1.

In a particular embodiment, the aqueous solution is water or a buffered aqueous solution.

In a particular embodiment, at least 80%, preferably at least 90% of the particles in the aqueous dispersion used according to the invention have a particle size of at most 10 μm. "Particle size" in case of particle size spherical particles refers to its diameter. In case of non-spherical particles, in terms of the present invention, "particle size" relates to the longest dimension of the particle, i.e. the length of that axis which connects the two points on the surface of the particle which are most remote from each other. The particle size can be determined, for example, by optical microscopy.

The above-described phosphonate (i.e. phosphonate A or the mixture of phosphonates A and B) is effective against a broad spectrum of phytopathogenic fungi, including soil-borne fungi.

The fungi to be combatted according to the fungicidal use and method of the invention present invention derive especially from the division of Ascomycetes, Oomycetes (syn. Peronosporomycetes), Deuteromycetes (syn. Fungi imperfecti), Zygomycetes, Plasmodiophoromycetes, Chytridiomycetes and Basidiomycetes; and further from the genera *Mucor* and *Penicillium*.

More preferably, fungi to be combatted according to the use and method of the invention are fungi from the division of Ascomycetes, Oomycetes, Deuteromycetes and/or Zygomycetes.

In a particular embodiment, the fungi to be combatted according to the present invention are fungi of the division of Ascomycetes.

In another particular embodiment, the fungi to be combatted according to the present invention are fungi of the division of Oomycetes.

In yet another particular embodiment, the fungi to be combatted according to the present invention are fungi of the division of Deuteromycetes.

In another particular embodiment, the fungi to be combatted according to the present invention are fungi of the division of Zygomycetes.

Among the division of Ascomycetes, fungi from the genera belonging to the order of Erysiphales, more precisely to the family of Erysiphaceae; and/or fungi belonging to the genus *Aspergillus* are preferably combatted in the use and method of the invention. More preferably, among the division of Ascomycetes, fungi from the genera belonging to the order of Erysiphales, more precisely to the family of Erysiphaceae, are combatted.

Genera belonging to Erysiphales, more precisely to Erysiphaceae, the only family within the order of Erysiphales, are *Arthrocladiella*, *Blumeria*, such as *Blumeria graminis* (*Oidium monilioides*); *Brasiliomyces*, *Bulbomicrosphaera*, *Bulbouncinula*, *Caespitotheca*, *Cystotheca*, *Erysiphe* (*Oidium*), such as *Erysiphe betae*, *Erysiphe cichoracearum*, *Erysiphe communis*, *Erysiphe cruciferarum*, *Erysiphe graminis*, *Erysiphe heraclei*, *Erysiphe necator* (syn. *Oidium tuckeri* or *Uncinula necator*), *Erysiphe pisi*, *Erysiphe polygoni*, *Oidium lycopersicum* or *Oidium ericinum*; *Golvinomyces*, *Leveillula* (*Oidiopsis*), *Medusosphaera*, *Microsphaera*, such as *Microsphaera alphitoides*, *Microsphaera azalea*, *Microsphaera begonia* or *Microsphaera trifolii*; *Neoerysiphe*, *Phyllactinia* (*Ovulariopsis*), *Pleochaeta*, *Podosphaera*, such as *Podosphaera aphanis*, *Podosphaera aucupariae*, *Podosphaera leucotricha*, *Podosphaera macularis*, *Podosphaera morsuvae* or *Podosphaera pannosa*; *Sawadaea*, *Setoerysiphe*, *Sphaerotheca*, such as *Sphaerotheca fuliginea*; *Typhulochaeta*, *Uncinula*, such as *Uncinula bicornis* or *Uncinula tulasnei*; and *Uncinuliella*.

Thus, preferably, fungi belonging to the order of Erysiphales to be combatted according to the present invention are selected from the group consisting of following genera: *Arthrocladiella*, *Blumeria*, especially *Blumeria graminis* (*Oidium monilioides*); *Brasiliomyces*, *Bulbomicrosphaera*, *Bulbouncinula*, *Caespitotheca*, *Cystotheca*, *Erysiphe* (*Oidium*), especially *Erysiphe betae*, *Erysiphe cichoracearum*, *Erysiphe communis*, *Erysiphe cruciferarum*, *Erysiphe graminis*, *Erysiphe heraclei*, *Erysiphe necator* (syn. *Oidium tuckeri* or *Uncinula necator*), *Erysiphe pisi*, *Erysiphe polygoni*, *Oidium lycopersicum* or *Oidium ericinum*; *Golvinomyces*, *Leveillula* (*Oidiopsis*), *Medusosphaera*, *Microsphaera*, especially *Microsphaera alphitoides*, *Microsphaera azalea*, *Microsphaera begonia* or *Microsphaera trifolii*; *Neoerysiphe*, *Phyllactinia* (*Ovulariopsis*), *Pleochaeta*, *Podosphaera*, especially *Podosphaera aphanis*, *Podosphaera aucupariae*, *Podosphaera leucotricha*, *Podosphaera macularis*, *Podosphaera mors-uvae* or *Podosphaera pannosa*; *Sawadaea*, *Setoerysiphe*, *Sphaerotheca*, especially *Sphaerotheca fuliginea*; *Typhulochaeta*, *Uncinula*, especially *Uncinula bicornis* or *Uncinula tulasnei*; and *Uncinuliella*.

Among the above, more preferably, fungi of following genera are combatted according to the present invention: *Erysiphe* and/or *Sphaeroteca*. Specifically, fungi belonging to the division of Ascomycetes to be combatted according to the present invention are selected from the group consisting of *Erysiphe necator* (syn *Oidium tuckeri* or *Uncinula necator*), *Erysiphe cichoracearum*, *Erysiphe graminis* and *Sphaerotheca fuliginea*.

Among the most relevant fungi from the division of Oomycetes are following genera: *Pythium*, especially *Pythium debaryanum*; *Phytophthora*, especially *Phytophthora infestans*; *Peronospora*, especially *Peronospora destructor*, *Peronospora farinose*, *Peronospora tabacina* (=*Peronospora hyoscyami* f. sp. *tabacina*), *Peronospora sparsa*, *Peronospora pulveracea* or *Peronospora pisi*; *Bremia*, especially *Bremia lactucae*; *Plasmopara*, especially *Plasmopara viticola*; *Albugo*, especially *Albugo candida*; *Pseudoperonospora*, especially *Pseudoperonospora humuli* or *Pseudoperonospora cucumerinum*; and *Sclerospora*, especially *Sclerospora graminicola*.

Thus, preferably, fungi belonging to the division of Oomycetes to be combatted according to the present invention are selected from the group consisting of following genera: *Pythium*, especially *Pythium debaryanum*; *Phytophthora*, especially *Phytophthora infestans*; *Peronospora*, especially *Peronospora destructor*, *Peronospora farinose*, *Peronospora tabacina* (=*Peronospora hyoscyami* f. sp. *tabacina*), *Peronospora sparsa*, *Peronospora pulveracea* or *Peronospora pisi*; *Bremia*, especially *Bremia lactucae*; *Plasmopara*, especially *Plasmopara viticola*; *Albugo*, especially *Albugo candida*; *Pseudoperonospora*, especially *Pseudoperonospora humuli* or *Pseudoperonospora cucumerinum*; and *Sclerospora*, especially *Sclerospora graminicola*.

Even more preferably, fungi belonging to the division of Oomycetes to be combatted according to the present invention are selected from the group consisting of *Pythium debaryanum*, *Phytophthora infestans*, *Peronospora destructor*, *Peronospora farinose*, *Peronospora tabacina*, *Peronospora sparsa*, *Peronospora pulveracea*, *Peronospora pisi*, *Bremia lactucae*, *Plasmopara viticola*, *Albugo candida*, *Pseudoperonospora humuli*, *Pseudoperonospora cucumerinum* and *Sclerospora graminicola*.

In particular, fungi belonging to the division of Oomycetes to be combatted according to the present invention are *Plasmopara viticola*.

Among the Deuteromycetes (syn. Fungi imperfecti), fungi to be preferably combatted according to the present invention are fungi from the order of Botrytis, Alternaria, Cladosporium, Fusarium, Monilia, Phoma and/or Stemphylium.

Among the Zygomycetes, fungi from the genus *Rhizopus* is to be combatted.

The genus *Rhizopus* encompasses following species: *Rhizopus oryzae*, *Rhizopus rouxii*, *Rhizopus microsporus*, *Rhizopus azygosporus*, *Rhizopus homothallicus*, *Rhizopus*

*caespitosus, Rhizopus stolonifera* and *Rhizopus sexualis*. Specifically, among the fungi of this genus, *Rhizopus stolonifera* is combatted according to the present invention.

In a preferred embodiment, the fungicidal use and method of the invention serve for combatting harmful fungi in plants, plant propagation material and/or soil wherein the plants grow or are to grow.

"Plant propagation material" refers to all generative parts of plants from which a complete plant can grow, such as seeds, grains, fruits, tubers, the rhizome, spores, cuttings or meristem tissue. Preferably, it refers to seeds.

The term "soil" as presently used is not restricted to soil as such (i.e. the material forming the pedosphere), be it present in the field, in a pot or border, but encompasses any suitable growth medium or growth substrate in which plants can grow, thus also artificial media. Preferably, however, it means soil in the proper sense.

The above-described mixture is effective against a broad spectrum of phytopathogenic fungi, including soil-borne fungi.

The target organisms are phytopathogenic fungi, in particular foliar phytopathogenic fungi, the latter being fungi which attack the overground part of the plant and in particular the leaves. However, the use and the method according to the invention also provide protection from soilborne or seed pathogens. Preferably, the target organisms for the present invention are foliar phytopathogenic fungi. Thus, in the (fungicidal) use and the method of the invention, preferably the overground part of the plant and in particular the leaves and, where expedient, additionally or alternatively also the stems or the branches (e.g. hops stems) are treated with phosphonate A or its mixture with phosphonate B. In another embodiment, the target organisms for the (fungicidal) use and method of the present invention are soilborne pathogens. According to this aspect, the underground part of the plants, e.g. the roots, or the medium in which the plants grow or are to grow, e.g. the soil, are treated with phosphonate A or its mixture with phosphonate B. In another embodiment, the target organisms for the (fungicidal) use and method of the present invention are seed pathogens. According to this aspect, the propagation material, e.g. the seeds, or the medium in which they are sown or are to be sown is treated with phosphonate A or its mixture with phosphonate B.

Under this aspect (i.e. combatting harmful fungi in plants, plant propagation material and/or soil wherein the plants grow or are to grow), more preferably, fungi to be combatted according to the use and method of the invention are selected from Ascomycetes and Oomycetes.

In a particular embodiment, the fungi to be combatted according to the present invention are fungi of the division of Ascomycetes.

In another particular embodiment, the fungi to be combatted according to the present invention are fungi of the division of Oomycetes.

From the division of Ascomycetes, fungi from the order of Erysiphales are among the most relevant fungi in agriculture. An important number of fungi of this order cause plant diseases called powdery mildew. Thus, in case that the fungicidal use and the fungicidal method of the invention are to be applied to plants, plant propagation material or to the soil in which the plant grows or is to grow, among the Ascomycetes, fungi from the order of Erysiphales are preferably to be combatted with the use and the method of the invention. Genera and species belonging to Erysiphales to be preferably combatted have already been listed above and reference is made thereto. Thus, fungi of following genera are in particular combatted according to the present invention: *Erysiphe* and/or *Sphaeroteca*. Specifically, fungi belonging to the division of Ascomycetes to be combatted according to the present invention are selected from the group consisting of *Erysiphe necator* (syn *Oidium tuckeri* or *Uncinula necator*), *Erysiphe graminis* and *Sphaerotheca fuliginea*.

With respect to the fungi from the division of Oomycetes to be preferably treated, reference is made to what has been said above. Thus, a specific fungus belonging to the division of Oomycetes to be combatted according to the present invention is *Plasmopara viticola*.

The target organisms for the present invention are preferably fungi responsible for fungal diseases in agricultural plants selected from grapes, hops, vegetables, such as tomato, bellpepper, cucurbit, cucumber, zucchini or eggplant, turf, tobacco, ornamentals and cereals and more preferably from grapes, hops, vegetables and cereals.

The term "grapes" includes vine.

The term "vegetable" is defined in the present invention through cultural tradition and does not refer to a biologically defined plant category. It is rather defined negatively by excluding fruit plants (fruit being here understood in the culinary sense again and not as the biological term), nuts, cereals and pseudocereals. Examples for vegetables are tomato, bellpepper, cucurbit, cucumber, zucchini, eggplant, cabbage, turnip, parsnip, radish, carrot, beetroot, onion, garlic, potato, sweet potato, leek, beans, lentils, peas and the like. Preferably, the vegetables are selected from the group consisting of tomato, bellpepper, cucurbit, cucumber, zucchini and eggplant.

Cereals are the cultivated forms of grasses (Poaceae) and include for example wheat (inclusive spelt, einkorn, emmer, kamut, durum and triticale), rye, barley, rice, wild rice, maize (corn), millet, sorghum, teff, fonio and oats.

The target organisms for the present invention are in particular fungal diseases in grapes.

In an alternative particular embodiment, the target organisms for the present invention are fungal diseases in hops.

In yet another particular embodiment, the target organisms for the present invention are fungi responsible for fungal diseases in vegetables selected from the group consisting of tomato, bellpepper, cucurbit, cucumber, zucchini and eggplant.

In yet another particular embodiment, the target organisms for the present invention are fungi responsible for fungal diseases in tobacco.

In yet another particular embodiment, the target organisms for the present invention are fungi responsible for fungal diseases in cereals, specifically wheat.

In a preferred embodiment, the phosphonate A or the mixture of phosphonates A and B is used for combatting powdery mildew, especially for combatting powdery mildew in grapes, hops, vegetables, turf, tobacco, ornamentals and/or cereals, more preferably in grapes, hops, vegetables and/or cereals, in particular in grapes, hops and/or cereals, specifically in grapes and/or hops, and very specifically in grapes. The vegetables are preferably selected from the group consisting of tomato, bellpepper, cucurbit, cucumber, zucchini and eggplant and are specifically cucumber, and the cereals are specifically wheat.

In another preferred embodiment, the phosphonate A or the mixture of phosphonates A and B is used for combatting downy mildew, especially for combatting downy mildew in grapes, hops, vegetables, turf, tobacco, ornamentals and/or cereals, more preferably in grapes, hops, vegetables and/or cereals, in particular in grapes, hops and/or cereals, specifically in grapes and/or hops, and very specifically in grapes. The vegetables are preferably selected from the group consisting of tomato, bellpepper, cucurbit, cucumber, zucchini and eggplant and are specifically cucumber, and the cereals are specifically wheat.

The plants are preferably treated in such a way that the plant or plant parts thereof are contacted with phosphonate A or its mixture with phosphonate B. As explained above, the term "mixture" in this context is not limited to a physical mixture. Thus, in case that also phosphonate B is used, phosphonate A and phosphonate B can be applied to the plant or to the plant parts in form of a physical mixture or separately. In the case of separate application, phosphonate A and phosphonate B can be applied simultaneously or successively, though, in the latter case, the individual components should be applied within a short time interval, preferably within a time interval of a few seconds or a few minutes, for example 1, 2 or 3 minutes, up to 1 day. Preference is given, however, to combined application using a ready-to-use formulation which comprises both components (i.e. to the use of phosphonate A and B as a physical mixture).

These remarks apply analogously to the treatment of seeds or soil, as well as to the use as a fertilizer (as described below).

Phosphonate A or its mixture with phosphonate B can be applied in various forms, e.g. as a liquid formulation, e.g. an aqueous dispersion, especially an aqueous suspension, or in solid form, such as a dust or powder. In a preferred embodiment, phosphonate A or its mixture with phosphonate B is applied in form of a liquid formulation, preferably an aqueous dispersion, especially an aqueous suspension. The aqueous suspension to be eventually applied is for example obtained from a suspension concentrate (SC), wettable powder (WP) or water-dispersible granulate (WG) which is diluted with water to the desired concentration.

If phosphonate A or its mixture with phosphonate B is applied in form of a liquid formulation, e.g. an aqueous dispersion, especially an aqueous suspension, the ready-to-use formulation contains the phosphonate A in an amount of preferably from 0.01 to 30 g/l, more preferably from 0.01 to 25 g/l, in particular from 0.01 to 20 g/l, more particularly from 0.05 to 10 g/l, even more particularly from 0.1 to 5 g/l and specifically from 0.1 to 1 g/l.

The treatment of the plants or parts thereof or of the seeds or soil in which the plant grow or is to grow can be both protective and curative, i.e. before or after an infection with phytopathogenic fungi. It is preferably carried out as close in time as possible to the infection event, i.e. before or after the infection at a point in time which is as close as possible to the infection. More preferably, it is carried out as protective treatment, i.e. before an infection with phytopathogenic fungi takes place.

The timing of the application, the number of applications and the application rates employed in each case have to be adapted to the prevailing conditions and have to be determined for each individual case by a person skilled in the art.

For instance, the application rate for a protective treatment via foliar application is generally in the range of from 0.01 to 100 kg/ha of phosphonate A, preferably from 0.1 to 50 kg/ha, more preferably from 0.1 to 20 kg/ha, in particular from 1 to 15 kg/ha and specifically from 2 to 10 kg/ha. The optimum application rates depend inter alia on the plant to be treated, on weather conditions (rainy conditions, for instance, generally making higher rates necessary), and on whether a protective or curative treatment is carried out (a curative treatment generally requiring lower application rates than a protective treatment), and can be determined for the individual case by the skilled person.

In a particular embodiment, if phosphonate A or its mixture with phosphonate B is to be used as an aqueous formulation in foliar application, the aqueous formulation expediently contains an adjuvant facilitating the penetration of plant cuticles, such as a wetting agent. The amount of wetting agent depends both on the type of agent and the plant target surface and is typically in the range from 0.001 to 1% by weight, in particular from 0.01 to 0.1% by weight, based on the total weight of the ready-to-use formulation. Wetting agents can be of anionic or nonionic nature and are, for example, naphthalenesulfonic acids including their alkali metal, alkaline earth metal, ammonium and amine salts, fatty alcohol ethoxylates, ethoxylated alkylphenols, alkyl polyglycosides, glycerol fatty acid esters, castor oil alkoxylates, fatty acid alkoxylates, fatty amide alkoxylates, fatty polydiethanolamides, lanolin ethoxylates, fatty acid polyglycol esters or organosilicons, such as the Silwet® brands.

Especially for a curative treatment, the addition of adjuvants facilitating the penetration of plant cuticles is expedient. Thus, especially in curative treatments, and especially if phosphonate A or its mixture with phosphonate B is to be used as an aqueous formulation in foliar application, the aqueous formulation preferably contains a wetting agent.

The above-described phosphonate A or its mixture with phosphonate B is not limited to act as a fungicide on plants, but has a general fungicidal action and can thus also be used for protecting material different from plants, plant propagation material and soil in which the plant grows or is to grow, such as, for example, inanimate material, from fungal attack, or for combatting fungi on material different from plants, plant propagation material or soil in which the plant lives or is to grow, such as, for example, inanimate material. Thus, the present mixture can also be used as a preservative and/or in the control of fungi in or on inanimate material.

Inanimate material to be treated according to the invention is for example foods. Another example for inanimate material is construction materials, such as plastering, coatings, paint, timber, flooring materials, metal, glass, brick, polymeric materials or concrete.

With respect to fungi to be preferably combatted, reference is made to the above remarks.

In another preferred embodiment, the above-defined phosphonate A or its mixture with phosphonate B is used as a fertilizer or plant nutrient. The terms "fertilizer" and "plant nutrient" are used synonymously. The molar ratio of calcium phosphonate in phosphonate A and in phosphonate B, if present, to magnesium phosphonate in phosphonate A and in phosphonate B, if present, is of from 10:1 to 1:10, preferably from 5:1 to 1:5, more preferably from 2:1 to 1:2, in particular from 1.5:1 to 1:1.5 and is specifically approximately 1:1. "Approximately" in this context includes deviations as they occur from weighing errors and/or from fluctuations in the composition of the salts (e.g. due to their source and natural variance of their origin) used for producing the mixture according to the invention.

The phosphonate A or its mixture with phosphonate B brings in phosphorus, calcium and magnesium, possibly also potassium and/or ammonium if phosphonate B is applied, too, and if this contains phosphonates of the latter countercations, especially via foliar application, but also via the roots.

With respect to preferred embodiments of phosphonate A, its mixture with phosphonate B and the form in which they are applied, reference is made to the above remarks.

A further aspect of the present invention relates to a mixture containing secondary calcium phosphonate and secondary magnesium phosphonate, where the molar ratio of secondary calcium phosphonate to secondary magnesium phosphonate is of from 1:10 to 10:1, preferably from 5:1 to 1:5, in particular from 2:1 to 1:2, specifically from 1.5:1 to 1:1.5; characterized in that the solid form of the mixture has a water solubility of at most 5 g/l at 20° C. Preferably, the mixture has a water solubility of at most 3 g/l at 20° C., in particular at most 2 g/l at 20° C.

"Solid form" refers to a solid which contains at most 5% by weight, preferably less than 2% by weight, based on the weight of the form, of liquid components (generally water).

The mixture of the invention is however not necessarily in the solid form; it can also be present in other forms, for example as an aqueous suspension. It is however defined that, when present in such other form, when this other form is converted into the solid form, e.g. by removal of water from an aqueous suspension, this solid form has the above-given properties.

In a preferred embodiment, the mixture additionally contains primary calcium phosphonate, primary magnesium phosphonate, secondary potassium phosphonate, primary potassium phosphonate or primary ammonium phosphonate or a mixture of at least two of these phosphonates. In this case, the weight ratio of the overall amount of secondary calcium phosphonate and secondary magnesium phosphonate to the overall amount of the additional phosphonates (primary calcium phosphonate, primary magnesium phosphonate, secondary potassium phosphonate, primary potassium phosphonate, primary ammonium phosphonate or a mixture of at least two of these phosphonates) is preferably of from 100:1 to 1:1, more preferably from 10:1 to 1.5:1, in particular from 10:1 to 2:1. Preferably, the molar ratio of secondary calcium phosphonate plus primary calcium phosphonate, if present, to secondary magnesium phosphonate plus primary magnesium phosphonate, if present, is of from 10:1 to 1:10, preferably from 5:1 to 1:5, in particular from 2:1 to 1:2, specifically from 1.5:1 to 1:1.5, very specifically approximately 1:1. "Approximately" in this context includes deviations as they occur from weighing errors and/or from fluctuations in the composition of the salts (e.g. due to their source and natural variance of their origin) used for producing the mixture according to the invention.

In particular, the mixture additionally contains primary calcium phosphonate and/or primary magnesium phosphonate.

In a preferred embodiment, the mixture is present as an aqueous dispersion, in particular as an aqueous suspension, in which at least 80%, in particular at least 90% of the particles have a particle size of at most 10 μm.

Another aspect of the present invention relates to a method for preparing a mixture containing secondary calcium phosphonate and secondary magnesium phosphonate, comprising reacting dolomite with phosphonic acid or with a primary phosphonate or with both, and preferably with phosphonic acid.

The primary phosphonates are preferably selected from primary alkali metal phosphonates, such as primary sodium phosphonate ($NaH_2PO_3$) or primary potassium phosphonate ($KH_2PO_3$), and ammonium phosphonate [$(NH_4)H_2PO_3$]. Preferably, primary potassium phosphonate, ammonium phosphonate or a mixture thereof is used.

The term "dolomite" designates on the one hand a sedimentary carbonate rock ("dolostone" or "dolomite rock") that contains a high percentage (mostly at least 90% by weight, based on the total weight of the dolomite rock) of the mineral dolomite, $CaMg(CO_3)_2$. On the other hand, as understood from the preceding remarks, the term "dolomite" also designates only the mineral dolomite of the elemental formula $CaMg(CO_3)_2$.

In terms of the present invention, the term "dolomite", unless specified otherwise, does not refer to dolomite rock, but refers to the mineral dolomite of the elemental formula $CaMg(CO_3)_2$, as it occurs in dolomite rock, and also includes partially calcinated dolomite, fully calcinated dolomite and mixtures of these forms. In partially calcinated dolomite, a part or all of the magnesium carbonate is converted into magnesium oxide. This is obtained by heating dolomite to ca. 850° C. Partially calcinated dolomite can be characterized by the formula $Ca(CO_3)/a \times MgO/b \times Mg(CO_3)$, where a and b are fractions of 1, so that a+b=1, where a is from 0.5 to 1, preferably from 0.8 to 1, in particular from 0.9 to 1, and b is from 0 to 0.5, preferably from 0 to 0.2, in particular from 0 to 0.1. In a specific embodiment, partially calcinated dolomite has the formula $Ca(CO_3)/0.9 \times MgO/0.1 \times Mg(CO_3)$. Fully calcinated dolomite has the elemental formula $CaMgO_2$.

In one preferred embodiment, in the method of the invention, dolomite in the proper sense ($CaMg(CO_3)_2$) is used.

One advantage of using dolomite in the proper sense ($CaMg(CO_3)_2$) is that this reacts at a lower reaction rate and thus less exothermically with the phosphonic acid or the primary phosphonate than calcinated dolomite, and as a consequence the formation of (toxic) phosphane, which can form under exothermic conditions, is avoided.

In another preferred embodiment, in the method of the invention, dolomite is used in partially calcinated form.

The partially calcinated form unites advantages and disadvantages of dolomite in the proper sense and dolomite in the fully calcinated form.

In another preferred embodiment, in the method of the invention, dolomite is used in fully calcinated form.

One advantage of using dolomite in fully calcinated form is that no carbon dioxide is formed, and thus there is no foaming nor has carbon dioxide to be removed. However, the reaction with dolomite in fully calcinated form is distinctly more exothermic than the reaction with dolomite in the proper sense, which can result in the formation of phosphane if the reaction heat is not properly dissipated. Keeping the reaction temperature below 70° C. avoids however the formation of phosphane, so that under such conditions dolomite in fully calcinated form can be used without any reservation in this respect.

In yet another preferred embodiment, in the method of the invention, a mixture at least two (i.e. two or three) of the following three components is used: dolomite in the proper sense, partially calcinated dolomite, fully calcinated dolomite.

Dolomite can either be obtained from mineral sources, i.e. from dolomite rock, but can also be recycled from industrial sources: Dolomite and partially calcinated dolomite are used as filter material in waterworks, such as water supply companies. Dolomite and partially calcinated dolomite are moreover used in waterworks for reducing the acidity (caused by excess $CO_2$) in the processing of drinking water. Waterworks regularly dispose of their dolomitic material, which is of still sufficient quality for use in the method of the present invention. This makes the starting material for the present method very inexpensive and moreover recycles a material which otherwise would have to be disposed of.

Thus, in a particular embodiment, in the method of the present invention, dolomite in the proper sense ($CaMg(CO_3)$ ₂), dolomite in partially calcinated form or a mixture thereof is used, where the dolomite is dolomite material obtained from waterworks, i.e. which has been used and fulfilled its function in a waterworks.

Alternatively, as dolomitic material, dolomite in the proper sense ($CaMg(CO_3)_2$), dolomite in partially calcinated form or mixtures thereof as used in waterworks can be used.

Dolomite and phosphonic acid are preferably used in molar ratios of from 1:1 to 1:4, more preferably from 1:1.2 to 1:4, in particular from 1:1.5 to 1:4, more particularly from 1:2 to 1:4, specifically from 1:2 to 1:3 and very specifically approximately 1:2. "Approximately" in this case includes deviations from the exact molar ratio due to weighing errors or deviations in purity of the starting compounds. For calculating the molar ratios, 1 mol of dolomite corresponds to 1 mol of $CaMg(CO_3)_2$ (ca. 184 g/mol) or of $Ca(CO_3)/a\times MgO/b\times Mg(CO_3)$ (e.g. for $Ca(CO_3)/0.9\times MgO/0.1\times Mg(CO_3)$ ca. 144.4 g/mol) or of $CaMgO_2$ (ca. 96 g/mol), and 1 mol of phosphonic acid corresponds to 1 mol of $H_3PO_3$ (ca. 82 g/mol).

The higher the relative amount of phosphonic acid used, the higher the amount of primary calcium and/or magnesium phosphonates in the obtained reaction mixture. These primary phosphonates have good water solubility and are thus suitable when a quick fungicidal action of the obtained mixture is desired. The secondary calcium and magnesium phosphonates, by contrast, are scarcely water-soluble and thus form depots on the treated substrate, which provides a long-term fungicidal action to the treated substrate. By varying the relative amount of phosphonic acid, it is thus possible to provide mixtures with a combined short-term and long-term effect or with an essentially long-term effect. It has to be noted that the above-indicated maximum amount of phosphonic acid (molar ratio of dolomite and phosphonic acid of 1:4) still leads to the formation of secondary calcium and magnesium phosphonates in substantial amounts.

If a primary phosphonate is used instead of phosphonic acid, the molar ratio of dolomite and the primary phosphonate is preferably from 1:1 to 1:8, more preferably from 1:2 to 1:8, in particular from 1:3 to 1:6, specifically from 1:4 to 1:6.

Dolomite and phosphonic acid or the primary phosphonate are generally reacted with each other by either (1.1) providing an aqueous dispersion of dolomite and (2.1) adding thereto the phosphonic acid or the primary phosphonate or a mixture thereof, either in pure form or as an aqueous solution, or inversely by (1.2) providing an aqueous solution of phosphonic acid or the primary phosphonate or a mixture thereof and (2.2) adding thereto dolomite, either in pure form or as an aqueous dispersion. Both sequences of addition can give comparative results. In another alternative, (1.3) an aqueous medium, e.g. water, is provided, and then (2.3) all reactive components, i.e. the phosphonic acid and/or the primary phosphonate and dolomite, either in pure form or as an aqueous solution/dispersion, are added simultaneously thereto.

If dolomite is used as a solid, this is preferably introduced into the reaction in a finely ground state, e.g. as a powder, in order to ensure a sufficient reaction rate. The particle size of solid phosphonic acid and primary phosphonate is less critical, as these dissolve instantaneously in water.

The component to be added in steps (2.1), (2.2) or (2.3) is preferably added continuously or portionwise.

If the reaction of dolomite and phosphonic acid or the primary phosphonate is carried out with steps (1.1) and (2.1), it is preferred to add in step (2.1) the phosphonic acid or the primary phosphonate or a mixture thereof as an aqueous solution, since otherwise care has to be taken to make the addition slowly, as in case of a too quick addition the (exothermic) reaction might result in locally high temperatures, increasing the risk for the formation of phosphane.

Carrying out the reaction with steps (1.1) and (2.1) has moreover the disadvantage that under certain circumstances, especially if dolomite is not used in a very finely ground state and if partially or fully calcinated dolomite is used, when addition of phosphonic acid or the primary phosphonate or the mixture thereof is started, the surface of dolomite may become coated with a barely soluble layer of secondary phosphonates, which considerably slows down the reaction rate.

The reaction via steps (1.2) and (2.2) is less demanding and generally proceeds with a higher reaction rate, and therefore, in a preferred embodiment, dolomite and phosphonic acid or the primary phosphonate or the mixture thereof are reacted with each other by (1.2) providing an aqueous solution of phosphonic acid or the primary phosphonate or a mixture thereof and (2.2) adding thereto dolomite, either in pure form or as an aqueous dispersion; specifically in pure form.

In order to obtain a finely dispersed product, the aqueous solution of phosphonic acid or the primary phosphonate or a mixture thereof provided in step (1.2) preferably contains the phosphonic acid or the primary phosphonate or a mixture thereof in an amount of from 10 to 50% by weight, preferably from 15 to 45% by weight, in particular from 20 to 40% by weight, based on the total weight of the aqueous solution provided in step (1.2).

When dolomite in the proper sense or partially calcinated dolomite are used, $CO_2$ evolves, which may cause foam formation. Therefore, it might be useful to add to the aqueous reaction medium, e.g. to the aqueous dispersion used in step (1.1) or (1.2) or the aqueous medium used in step (1.3) or to the added components if these are added in form of aqueous solutions or dispersion, a foam inhibitor. Typical foam inhibitors are silicon-based compounds, e.g. silicones, such as dimethylsilicones or polyethyleneoxide-modified heptamethyltrisiloxanes; long chain alcohols, and salts of fatty acids. Typically, they are used in an amount of from 0.1 to 10 g per l of the aqueous medium provided before the second reactant or both reactants are added, preferably from 0.5 to 5 g/l and in particular 1 to 5 g/l.

Depending on the concentration of the reactants, on the surface of the components, if added in solid form, and especially on the rate of addition in steps (2.1), (2.2) or (2.3), the reaction may proceed exothermically, so that it might be useful to provide means for controlling exothermy, such as external cooling.

However, the reaction generally proceeds controllably, so that it is principally even possible to carry out the reaction directly in the tank mix, especially if the addition rate is sufficiently slow and especially if fully calcinated dolomite is used, so that the problem of $CO_2$ formation does not arise.

The aqueous dispersion or solution used in step (1.1) or (1.2) or the aqueous medium used in step (1.3) and/or the aqueous dispersions or solutions used in step (2.1), (2.2) or (2.3) may moreover contain further phosphonates, such as primary or secondary potassium phosphonate or ammonium phosphonate. In this case, the mixture obtained contains phosphonate B as defined and described above.

Alternatively, for producing a mixture which also contains phosphonate B as defined and described above, the mixture obtained from the reaction of dolomite with the phosphonic acid or the primary phosphonate is supplemented with primary and/or secondary potassium phosphonate and/or ammonium phosphonate in the desired amount.

Depending on the relative amounts of the starting compounds used, the obtained reaction mixture generally has a pH in the range of 2 to 8, preferably 3 to 7, in particular 4 to 7. If the desired pH does not correspond to the obtained one, this is adjusted by usual means, such as adding a base like NaOH, KOH, $Na_2CO_3$ or $CaCO_3$ if the pH is lower than desired, or inversely, if the pH is too high, by adding an acid, suitably phosphonic acid, or any other non-toxic acid, such as HCl, phosphoric acid or citric acid.

Alternatively, the reaction mixture can be buffered, either by using yet a buffered aqueous reaction medium or by adding a buffer to the reaction mixture after completion of the reaction.

The obtained reaction mixture is generally a suspension. The method of the invention yields the insoluble salts (secondary calcium phosphonate and secondary magnesium phosphonate) as very small particles, so that the obtained suspension is very fine and sometimes even of a cream-like consistency. This consistence allows direct application of the reaction mixture in the use and method of the invention without the need of any further processing. In a particular embodiment, at least 80%, in particular at least 90% of the particles in the obtained reaction mixture have a particle size of at most 10 μm. Of course, the reaction mixture can be further diluted or concentrated; see below remarks. Whether dilution or concentration is expedient depends of course inter alia on the intended application form and rate and on the applied reaction conditions, especially the dilution of the reaction mixture.

The reaction mixture is generally of sufficient purity to be used as such or, if desired, after further dilution in the use and method of the invention. Alternatively, the mixture can be dried to obtain a solid, e.g. by filtering or centrifugating the precipitate and drying it or by removing the water from the reaction mixture, e.g. by distillation, if desired under vacuum, evaporation or drying in a tumble dryer or by spray-drying. The obtained solid mixture can be either used in powder or dust form or re-suspended in an aqueous medium. If the mixture is to be applied in powder or dust form, it might be necessary to further comminute it, so as to obtain a dustable powder.

In a preferred embodiment, however, the reaction mixture is used in the use and method of the invention without drying. If appropriate, the reaction mixture can be further diluted, e.g. in order to ease application with a pump or a spray gun.

The mixture can however also be formulated in any other use form.

In a particular embodiment, if the mixture is to be used as an aqueous formulation in foliar application, a wetting agent is added. The amount of wetting agent is typically in the range from 0.001 to 1% by weight, in particular from 0.01 to 0.1% by weight, based on the total weight of the ready-to-use formulation. Wetting agents can be of anionic or nonionic nature and are, for example, naphthalenesulfonic acids including their alkali metal, alkaline earth metal, ammonium and amine salts, fatty alcohol ethoxylates, ethoxylated alkylphenols, alkyl polyglycosides, glycerol fatty acid esters, castor oil alkoxylates, fatty acid alkoxylates, fatty amide alkoxylates, fatty polydiethanolamides, lanolin ethoxylates, fatty acid polyglycol esters or organosilicons, such as the Silwet® brands.

In another aspect, the invention relates to a mixture containing secondary calcium phosphonate and secondary magnesium phosphonate, obtainable by the above-described method.

The invention also relates to the use of this mixture for combatting harmful fungi, to a method for combatting harmful fungi using said mixture and to its use as fertilizer or plant nutrient.

In a particular embodiment, the composition used according to the invention, or the mixture according to the invention, i.e. the phosphonate A or the mixture of phosphonate A and a phosphonate B, does not contain any added phosphate. "Added" phosphate relates to the circumstance that phosphonate A or phosphonate B may contain minor amounts of phosphates stemming from the natural source from which phosphonate A or phosphonate B are produced or from the manufacturing process thereof, but such phosphates, if present, are generally contained in low amounts, such as less than 1% by weight, based on the total weight of phosphonate A or phosphonate B. In any case, in a particular embodiment, no additional phosphate is applied in the use according to the invention or added to the mixture of the invention.

In contrast to what was to be expected from the prior art, mixtures containing secondary calcium phosphonate and secondary magnesium phosphonate are surprisingly effective against Ascomycetes. Moreover, these mixtures are effective against a wide range of other harmful fungi and can be used for the protective and curative treatment of plants as well as for the treatment of arbitrary, also inanimate, substrates. Advantageously, they have a long-lasting action, which can, if desired and required, be combined with an imminent action if mixed with the phosphonates listed above as ingredients of phosphonate B. Without wishing to be bound by theory, it is assumed that the long-lasting effect is at least partially due to the low water solubility of secondary calcium and magnesium phosphonates, thus releasing the active agent only slowly.

Furthermore, mixtures containing secondary calcium phosphonate and secondary magnesium phosphonate are useful fertilizers and plant nutrients.

A specific mixture of secondary calcium phosphonate and secondary magnesium phosphonate is obtained by the production method of the invention. The method of the invention provides this specific mixture containing secondary calcium phosphonate and secondary magnesium phosphonate in a very simple way, using low-priced starting materials and not needing any purification or isolation steps.

The invention is now illustrated by the following examples and figures.

FIGURES

Figure 3:
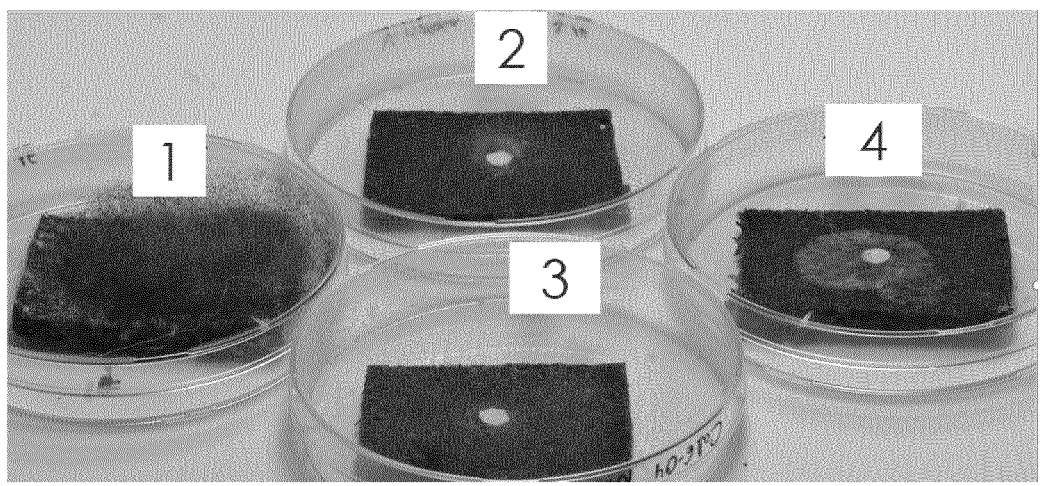

FIG. 3 shows slices of Pumpernickel one week after inoculation with *Rhizopus stolonifer*. 1 is the water-treated control slice, 2 is the slice treated with the mixture of example 8 (1:50 dilution), 3 is the slice treated with the mixture of example 1 (1:50 dilution) and 4 is the slice treated with sorbic acid, a standard preservative (see example B.4).

Remark to the slice treated with the mixture of example 1: the whitish glint is due to the higher content of particles compared with example 8.

EXAMPLES

A. Synthetic Examples

Dolomite powder, partially calcinated dolomite and fully calcinated dolomite were obtained from Dolomitwerk Jettenberg, Germany. Phosphonic acid was obtained from ICL-IP Bitterfeld-Wolfen, Germany. In examples B, in each case, 0.2 g of the defoamer Silwet L-77 was added. The water used was demineralized water.

Example 1

14.4 g (0.1 mol) of partially calcinated dolomite with a particle size of <0.5 mm were slowly suspended into 70 ml of water. Then 16.4 g (0.2 mol) of crystalline phosphonic acid were added within 1 h at such a rate that the temperature did not exceed 70° C. The mixture was stirred overnight to give a stirrable white suspension with a pH of 4.8.

Example 2

10 g (0.05 mol) of dolomite powder with a particle size of 20 μm were suspended into 50 ml of water. Then 9.02 g (0.11 mol) of crystalline phosphonic acid were added at such a rate that the foam formation was controllable. A white suspension with a pH of 6.5 was obtained.

Example 3

44.6 g (0.54 mol) of phosphonic acid were dissolved in 110 ml of water. Then 50 g (0.27 mol) of dolomite powder were added. The mixture was stirred overnight to give a white suspension with a pH of 7.

Example 4

66.9 g (0.81 mol) of phosphonic acid were dissolved in 110 ml of water. Then 50 g (0.27 mol) of dolomite powder were added. The mixture was stirred overnight to give a stirrable white suspension with a pH of 5.2.

Example 5

89 g (1.1 mol) of phosphonic acid were dissolved in 110 ml of water. Then 50 g (0.27 mol) of dolomite powder were added. The mixture was stirred overnight to give a stirrable white suspension with a pH of 3.6.

Example 6

44.1 g (0.54 mol) of phosphonic acid were dissolved in 110 ml of water. Then 39.3 g (0.27 mol) of partially calcinated dolomite powder were added. The mixture was stirred overnight to give a stirrable white suspension with a pH of 4.5.

Example 7

44.1 g (0.54 mol) of phosphonic acid were dissolved in 110 ml of water. Then 25.9 g (0.27 mol) of fully calcinated dolomite were added. The mixture was stirred overnight to give a stirrable white suspension with a pH of 6.

Example 8

66.9 g (0.81 mol) of phosphonic acid were dissolved in 110 ml of water. Then 25.9 g (0.27 mol) of fully calcinated dolomite were added within 60 min. The mixture was stirred overnight to give a stirrable white suspension with a pH of 4.8.

Example 9

25.9 g (0.27 ml) of fully calcinated dolomite were dissolved in 110 ml of water. Then 66.9 g (0.81 mol) of phosphonic acid were added within 60 min. The mixture was stirred overnight to give a stirrable white suspension with a pH of 5.

Example 10

88.2 g (1.1 mol) of phosphonic acid were dissolved in 110 ml of water. Then 25.9 g (0.27 mol) of fully calcinated dolomite were added within 60 min. The mixture was stirred overnight to give a stirrable white suspension with a pH of 2.

Example 11

To the suspension of example 10, 60.48 g of an aqueous 50% KOH solution was added portionwise at such a rate that the temperature did not exceed 50° C. A white, cream-like product with pH 5.3 was obtained.

Example 12

To a 30% by weight aqueous solution of 10 mol of phosphonic acid were added 4 mol of Dolomit DJ (very pure, fully calcinated dolomite with equimolar amounts of Ca oxide and Mg oxide) from Dolomitwerk Jettenberg Schöndorfer GmbH, Germany within 30 min. Then, a suspension of 3.5 mol of Dolomit DJ in 600 ml of water were added within 60 min. Both addition steps were carried out under cooling to keep the temperature below 60° C. The mixture was stirred for 6 h to give a finely dispersed suspension with a pH of 3.

Example 13 (For Comparison)

To a 30% by weight aqueous solution of 10 mol of phosphonic acid were added 7.5 mol of magnesium carbonate within 30 min; the temperature was below 60° C. Then, 600 ml of water were added. The mixture was stirred for 6 h to give a finely dispersed suspension with a pH of 3-4.

Example 14 (For Comparison)

To a 30% by weight aqueous solution of 10 mol of phosphonic acid were added 7.5 mol of calcium carbonate within 30 min; the temperature was below 60° C. Then, 600 ml of water were added. The mixture was stirred for 6 h to give a finely dispersed suspension with a pH of 3-4.

B. Biological Examples

The reaction mixture obtained in example 1 was diluted with water in 1:50 v/v ratio, then 0.025% Silwet® L-77 was added.

B.1 Protective Action Against *Sphaerotheca fuliginea* in Cucumber

The two fully developed primary leaves of *Trichosanthes cucumerina* were sprayed with the above mixture to run-off point.

For comparative reasons, the two fully developed primary leaves of other *Trichosanthes cucumerina* plants were treated with VeriPhos® from Kwizda Agro, Austria, containing a mixture of primary potassium phosphonate and dipotassium phosphate ($KH_2PO_3/K_2HPO_4$). Dilution was calculated to finally result in the same molar concentration of phosphonate like example 1.

The next day, the plants were inoculated with conidia of *Sphaerotheca fuliginea*.

Eight days after application, the extent of infection was determined and the efficacy W was calculated from the infected leave surface according to Abbot's formula:

$$W=(1-\alpha/\beta) \times 100$$

α corresponds to the infection of the treated plants in % and β to the infection of the untreated (control) plants in %.

When efficacy is 0, the degree of infection corresponds to that of untreated plants, while an efficacy of 100 means no infection.

The results are compiled in table 1

TABLE 1

| Treatment | Efficacy |
| --- | --- |
| — (control) | 0 |
| VeriPhos (comparative) | 56 |
| Mixture of example 1 | 86 |

B.2 Protective Action Against *Uncinula necator* in Vine Grapes

Figure 1:
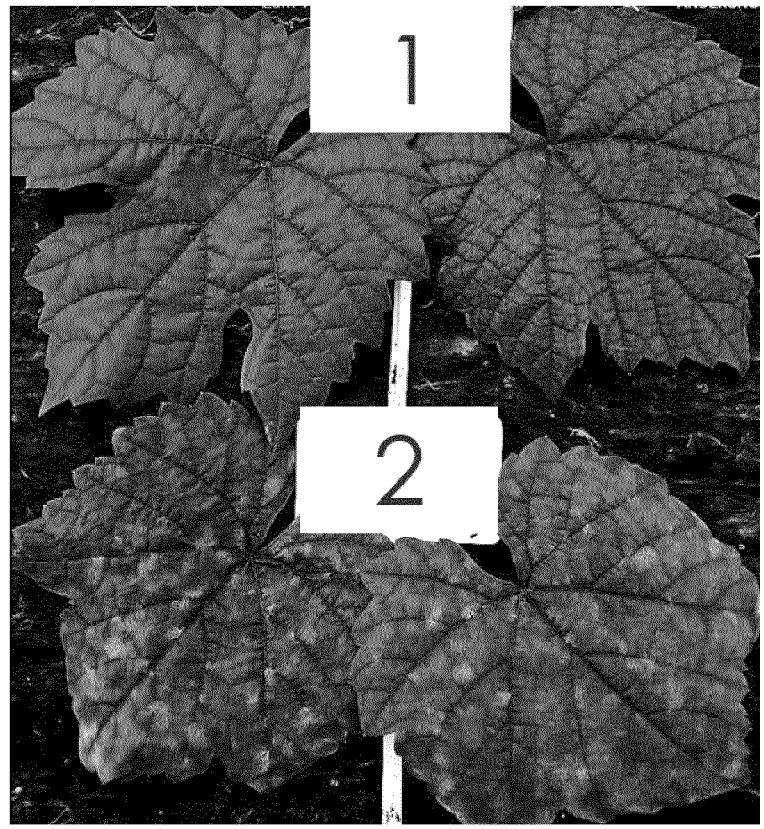
FIG. 1 shows leaves of vine grapes of the variety "Müller-Thurgau" 8 days after infection with *Uncinula necator* (see example B.2). 1 is the leaves treated with the suspension of example 1, and 2 is the untreated control.

Leaves of vine grapes of the variety "Müller-Thurgau" sprout with 6 to 10 fully developed leaves were treated in analogy to example B.1. The results are compiled in table 2 and shown in FIG. 1.

TABLE 2

| Treatment | Efficacy |
| --- | --- |
| — (control) | 0 |
| Mixture of example 1 | 100 |

B.3 Protective Action Against *Erysiphe graminis* in wheat

Figure 2:
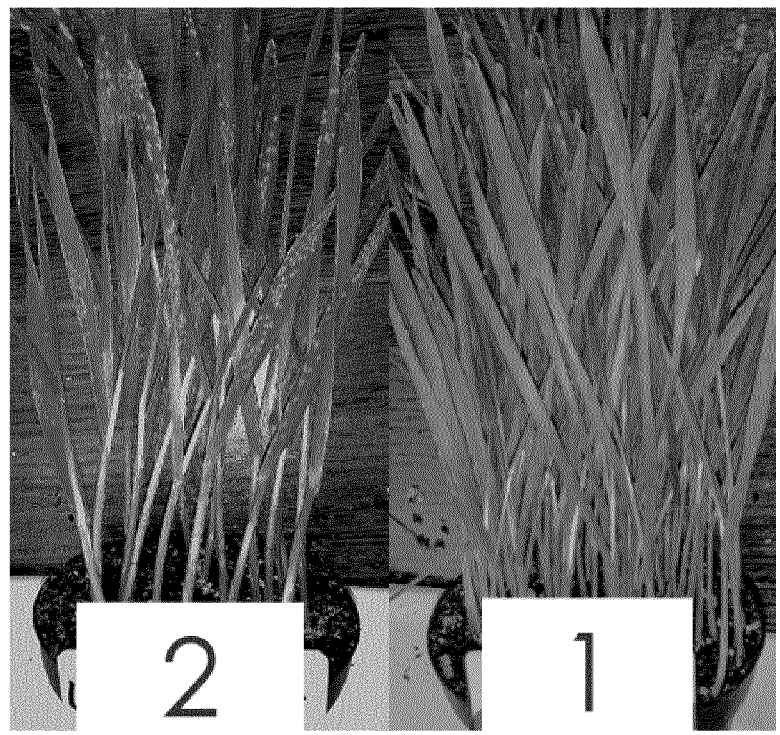
FIG. 2 shows wheat plants of the variety "Kanzler" 8 days after infection with *Erysiphe graminis* (see example B.3). 1 is the plants treated with the suspension of example 1, and 2 is the untreated control.

Pots with wheat plants of the variety "Kanzler" (first two leaves developed) were treated in analogy to example B.1. The results are compiled in table 3 and shown in FIG. 2.

TABLE 3

| Treatment | Efficacy |
| --- | --- |
| — (control) | 0 |
| Mixture of example 1 | 83 |

Analogous results were obtained with the reaction products of examples 2 to 11.

B.4 Protective Action Against *Rhizopus stolonifer* on Rye Bread ("Pumpernickel")

Sterile slices of Pumpernickel were each sprayed with water (control), a 0.1% sorbic acid solution (a standard preservative) or the mixture of example 1 or of example 8 (1:50 diluted with water). For inoculation with the fungus, small disks of blotting paper were soaked with a spore suspension of *Rhizopus stolonifer* and placed onto the center of Pumpernickel slices. After one week of incubation, the degree of fungus formation was examined. The results are compiled in table 4 and shown in FIG. 3.

TABLE 4

| Treatment | Infected surface area [%] |
| --- | --- |
| — (control) | 80 |
| Mixture of example 1 | <5 |
| Mixture of example 8 | <5 |
| Sorbic acid | 40 |

As can be seen, the fungus grew abundantly on the untreated control bread slice, while the slices treated according to the invention showed virtually no infection.

B.5 Effect Against *Plasmopara viticola* in Grapevines

Potted grapevines were inoculated with *Plasmopara viticola* both before foliar treatment with the active agent and after washing the active agent coating off the leaves in order to test the effect of the residual depot of actives. To ensure a good comparability of the results and avoid or at least strongly minimize falsification of the effects, e.g. due to the use of leaves of different physiological age or of different expositions, a half-leaf treatment was carried out: In each case only one half of a leaf was treated, while the other half remained untreated and served as a control and reference for determining efficacy; the two halves being separated by the middle leaf vein. For this purpose a precision sprayer was used for applying the active compounds on the one leaf half, while the half which was to stay untreated was covered with a blotting paper during spraying. The active compounds are not volatile and thus can be expected not migrate from one half onto the other via vapor phase. Due to principles of plant physiology there is also no significant internal transport between leaf areas separated by the middle leaf vein.

B.5.1 Protective and Curative Treatment against *Plasmopara viticola*

For a treatment according to the invention, the reaction mixture obtained in example 12 was diluted with water in 1:100 v/v ratio, then 0.05% Silwet® L-77 was added. For comparison, the reaction mixtures obtained in examples 13 and 14, respectively, were diluted with water in 1:200 v/v ratio, then 0.05% Silwet® L-77 was added.

In a greenhouse, potted grapevine plants (shoots with 10-14 leaves), were inoculated with a freshly prepared aqueous spore suspension of *Plasmopara viticola* ($4 \times 10^4$ cell/ml; 50 µl of suspension sprayed per leaf). The plants were kept for 12 h in a humid chamber.

Then the plants were subjected to a half-leaf treatment by applying either a suspension of the product of example 13 containing secondary magnesium phosphonate, or of the product of example 14 containing secondary calcium phosphonate, or of the product of example 12 containing secondary calcium and magnesium phosphonate; in each case diluted and supplemented with a wetting agent as defined above. The application rate was in each case ca. 2 µl/cm². After 24 h the plants were washed by immersion into water and after drying subjected to a second inoculation with the above-described aqueous spore suspension of *Plasmopara viticola*.

6 days after the first inoculation the plants were placed for 12 h into a humid chamber and then the extent of infection was determined visually and the efficacy W was calculated from the infected leave surface according to the above Abbot's formula.

The expected efficacies for active compound combinations (i.e. secondary magnesium and calcium phosphonate) were determined using Colby's formula (Colby, S. R., "Calculating synergistic and antagonistic responses of herbicide combinations", Weeds, 15, pp. 20-22, 1967) and compared to the observed efficacies.

Colby's formula: $E = x + y - x \cdot y/100$

E expected efficacy, expressed in % of the untreated control, when using the mixture of the active compounds A and B at the concentrations a and b x efficacy, expressed in % of the untreated control, when using the active compound A at the concentration a y efficacy, expressed in % of the untreated control, when using the active compound B at the concentration b

| Active compound | Calculated efficacy* [%] | Observed efficacy [%] |
|---|---|---|
| Mg phosphonate of example 13 | — | 16.5 |
| Ca phosphonate of example 14 | — | 24.6 |
| Ca/Mg phosphonate of example 12 | 37.1 | 80 |

*according to Colby

As can be seen from the results, the mixture according to the invention has a synergistic effect.

B.5.2 Curative Treatment Against *Plasmopara viticola*

The experiment was carried out in analogy to B.5.1, however without the second inoculation. 5 days after the inoculation the plants were placed for 12 h into a humid chamber and then the extent of infection was determined visually and the efficacy W was calculated from the infected leave surface according to Abbot's formula. The expected efficacies for active compound combinations (i.e. secondary magnesium and calcium phosphonate) were determined using Colby's formula.

| Active compound | Calculated efficacy* [%] | Observed efficacy [%] |
|---|---|---|
| Mg phosphonate of example 13 | — | 47.3 |
| Ca phosphonate of example 14 | — | 18.3 |
| Ca/Mg phosphonate of example 12 | 56.9 | 92.3 |

*according to Colby

B.5.3 Protective Treatment Against *Plasmopara viticola*

The experiment was carried out in analogy to B.5.1, however without the first inoculation. 5 days after the inoculation the plants were placed for 12 h into a humid chamber and then the extent of infection was determined visually and the efficacy W was calculated from the infected leave surface according to Abbot's formula. The expected efficacies for active compound combinations (i.e. secondary magnesium and calcium phosphonate) were determined using Colby's formula.

| Active compound | Calculated efficacy* [%] | Observed efficacy [%] |
|---|---|---|
| Mg phosphonate of example 13 | — | 44.5 |
| Ca phosphonate of example 14 | — | 35.1 |
| Ca/Mg phosphonate of example 12 | 64.0 | 97.6 |

*according to Colby

B.6 Protective Treatment Against *Erysiphe graminis* in Wheat

In a greenhouse, wheat plants of the cultivar Kanzler with 2-3 fully developed leaves were sprayed to runoff-point with either a suspension of the product of example 13 containing secondary magnesium phosphonate, or of the product of example 14 containing secondary calcium phosphonate, or of the product of example 12 containing secondary calcium and magnesium phosphonate; in each case diluted and supplemented with a wetting agent as defined in example B.5.1. After 24 h the plants were inoculated with conidia of *Erysiphe graminis*. 18 days after the treatment with the active compounds the extent of infection (formation of conidia) was determined visually and the efficacy W was calculated from the infected leave surface according to Abbot's formula. The expected efficacies for active compound combinations (i.e. secondary magnesium and calcium phosphonate) were determined using Colby's formula.

| Active compound | Calculated efficacy* [%] | Observed efficacy [%] |
|---|---|---|
| Mg phosphonate of example 13 | — | 36.7 |
| Ca phosphonate of example 14 | — | 11.7 |
| Ca/Mg phosphonate of example 12 | 44.1 | 73.3 |

*according to Colby

B.7 Protective Treatment Against *Sphaerotheca fuliginea* and *Erysiphe cichoracearum* in Cucumber In a greenhouse, leaves of *Cucumis sativus* plants var. "Chinesische Schlangengurke" were subjected to a half-leaf treatment as described in B.5 with either a suspension of the product of example 13 containing secondary magnesium phosphonate, or of the product of example 14 containing secondary calcium phosphonate, or of the product of example 12 containing secondary calcium and magnesium phosphonate; in each case diluted and supplemented with a wetting agent as defined in example B.5.1. After 24 h the plants were inoculated with mixed conidia of *Sphaerotheca fuliginea* and *Erysiphe cichoracearum*. 18 days after the treatment with the active compounds the extent of infection (formation of conidia) was determined visually and the efficacy W was calculated from the infected leave surface according to Abbot's formula. The expected efficacies for active compound combinations (i.e. secondary magnesium and calcium phosphonate) were determined using Colby's formula.

| Active compound | Calculated efficacy* [%] | Observed efficacy [%] |
|---|---|---|
| Mg phosphonate of example 13 | — | 43.3 |
| Ca phosphonate of example 14 | — | 20.0 |
| Ca/Mg phosphonate of example 12 | 54.7 | 86.7 |

*according to Colby

We claim:

1. A method for combatting harmful fungi, comprising treating the harmful fungi, their habitat or the materials or plants to be protected against fungal attack, or soil in which the plants grow or are to grow or plant propagation material, with an effective amount of a phosphonate A or of a mixture of phosphonate A and a phosphonate B, wherein the method does not include the therapeutical treatment of a human or animal body; where phosphonate A is a mixture of secondary calcium phosphonate and secondary magnesium phosphonate, and phosphonate B is selected from the group consisting of primary calcium phosphonate, primary magnesium phosphonate, secondary potassium phosphonate, primary potassium phosphonate, primary ammonium phosphonate and mixtures thereof;

where the molar ratio of calcium phosphonate in phosphonate A and in phosphonate B, if present, to magnesium phosphonate in phosphonate A and in phosphonate B, if present, is of from 2:1 to 1:2.

2. The method as claimed in claim 1, where the molar ratio of calcium phosphonate in phosphonate A and in phosphonate B, if present, to magnesium phosphonate in phosphonate A and in phosphonate B, if present, is of from 1.5:1 to 1:1.5.

3. The method as claimed in claim 1, where a mixture of phosphonate A and phosphonate B is used, where the weight ratio of the overall amount of phosphonate A to the overall amount of phosphonate B is of from 100:1 to 1:1.

4. The method as claimed in claim 3, where the weight ratio of the overall amount of phosphonate A to the overall amount of phosphonate B is of from 10:1 to 1.5:1.

5. The method as claimed in claim 1, where the phosphonate is used as an aqueous dispersion.

6. The method as claimed in claim 1, for combatting phytopathogenic fungi.

7. The method as claimed in claim 6, for combatting foliar phytopathogenic fungi, soilborne fungi and/or seed pathogens.

8. The method as claimed in claim 1, for combatting fungi selected from the group consisting of Ascomycetes, Oomycetes, Deuteromycetes and Zygomycetes.

9. The method as claimed in claim 8, for combatting Ascomycetes.

10. The method as claimed in claim 8, for combatting fungi of the order Erysiphales and/or of the genus *Rhizopus*.

11. The method as claimed in claim 10, for combatting *Erysiphe necator*, *Erysiphe graminis*, *Erysiphe cichoracearum*, *Sphaerotheca fuliginea* and/or *Rhizopus stolonifer*.

12. The method as claimed in claim 8, for combatting Oomycetes.

13. The method as claimed in claim 12, for combatting fungi of the genus *Plasmopara*.

14. The method of claim 1, wherein the treatment is with a mixture of phosphonate A and phosphonate B, the weight ratio of calcium phosphonate to magnesium phosphonate is 2:1 to 1:2, and the harmful fungi is Ascomycetes.

\* \* \* \* \*